(12) United States Patent
Atmur

(10) Patent No.: US 9,929,623 B2
(45) Date of Patent: Mar. 27, 2018

(54) RELUCTANCE MOTOR WITH VIRTUAL ROTOR

(71) Applicant: The Boeing Company, Chicago, IL (US)

(72) Inventor: Robert J. Atmur, Whittier, CA (US)

(73) Assignee: THE BOEING COMPANY, Chicago, IL (US)

( * ) Notice: Subject to any disclaimer, the term of this patent is extended or adjusted under 35 U.S.C. 154(b) by 636 days.

(21) Appl. No.: 14/567,079

(22) Filed: Dec. 11, 2014

(65) Prior Publication Data

US 2016/0172928 A1   Jun. 16, 2016

(51) Int. Cl.
| | |
|---|---|
| *H02K 7/116* | (2006.01) |
| *H02K 7/06* | (2006.01) |
| *H02K 41/06* | (2006.01) |
| *H02K 3/28* | (2006.01) |
| *H02K 1/14* | (2006.01) |

(52) U.S. Cl.
CPC .............. *H02K 7/06* (2013.01); *H02K 3/28* (2013.01); *H02K 7/116* (2013.01); *H02K 41/065* (2013.01); *H02K 1/146* (2013.01)

(58) Field of Classification Search
CPC ...... H02K 41/00; H02K 41/06; H02K 41/065; H02K 7/00; H02K 7/06; H02K 7/11; H02K 7/116; H02K 37/00
USPC ..................................................... 310/80, 82
See application file for complete search history.

(56) References Cited

U.S. PATENT DOCUMENTS

| | | | |
|---|---|---|---|
| 1,495,784 A | 5/1924 | Fereday | |
| 2,509,391 A | 5/1950 | Hansen et al. | |
| 3,341,725 A | 6/1967 | Gifford | |
| 3,474,272 A * | 10/1969 | Newell | H02K 41/065 310/180 |
| 3,530,322 A * | 9/1970 | Newell | H02K 7/065 310/82 |
| 3,585,426 A | 6/1971 | Newell | |
| RE29,411 E * | 9/1977 | Newell | H02K 41/065 310/49.47 |
| 4,081,702 A | 3/1978 | Neumann | |

(Continued)

FOREIGN PATENT DOCUMENTS

| | | |
|---|---|---|
| DE | 1788145 A1 | 5/1973 |
| DE | 19754921 A1 | 6/1999 |

(Continued)

OTHER PUBLICATIONS

International Search Report and Written Opinion, dated Jun. 12, 2015, regarding Application No. PCT/US2014/046545, 11 pages.

(Continued)

*Primary Examiner* — Tran Nguyen
(74) *Attorney, Agent, or Firm* — Yee & Associates, P.C.

(57) ABSTRACT

A method and apparatus for operating a reluctance motor. The apparatus comprises a stator and a plate. The stator includes a plurality of electromagnetic coils having an overlapped configuration. Applying multi-phase current to the plurality of electromagnetic coils generates a magnetic field. The plate forms a virtual pole when a portion of the plate contacts the stator in response to the magnetic field. Rotating the magnetic field about a center axis through the stator rotates the virtual pole about the center axis.

18 Claims, 14 Drawing Sheets

(56) References Cited

U.S. PATENT DOCUMENTS

| | | | |
|---|---|---|---|
| 4,837,470 A * | 6/1989 | Tamura | H02K 41/065 310/82 |
| 4,906,881 A * | 3/1990 | Knight | H02K 41/065 310/82 |
| 5,099,186 A | 3/1992 | Rippel et al. | |
| 5,309,041 A * | 5/1994 | Kawai | H02K 41/065 310/49.48 |
| 5,804,898 A * | 9/1998 | Kawai | H02K 41/065 310/268 |
| 6,232,685 B1 | 5/2001 | Swetish et al. | |
| 6,914,420 B2 | 7/2005 | Crocker | |
| 7,194,321 B2 | 3/2007 | Sun et al. | |
| 7,453,176 B2 | 11/2008 | Davison | |
| 8,796,891 B2 | 8/2014 | Nakamura | |
| 9,035,584 B2 | 5/2015 | Cameron | |
| 9,164,497 B2 | 10/2015 | Cameron et al. | |
| 9,404,489 B1 | 8/2016 | Atmur et al. | |
| 2002/0036435 A1 | 3/2002 | Ooyama et al. | |
| 2005/0031322 A1 | 2/2005 | Boyle et al. | |
| 2007/0170810 A1 | 7/2007 | Hirzel | |
| 2008/0034956 A1 | 2/2008 | Ochi et al. | |
| 2008/0084171 A1 | 4/2008 | Leehey et al. | |
| 2009/0009011 A1 | 1/2009 | Edleson et al. | |
| 2011/0074232 A1 * | 3/2011 | Murray | H02K 19/06 310/46 |
| 2011/0290353 A1 | 12/2011 | Fukui et al. | |
| 2012/0005840 A1 | 1/2012 | Jang et al. | |
| 2012/0074876 A1 | 3/2012 | Redler | |
| 2014/0285072 A1 | 9/2014 | Atmur et al. | |
| 2015/0008854 A1 | 1/2015 | Cameron | |
| 2015/0015174 A1 | 1/2015 | Atmur et al. | |
| 2015/0091491 A1 | 4/2015 | Cameron et al. | |
| 2016/0172929 A1 | 6/2016 | Atmur et al. | |

FOREIGN PATENT DOCUMENTS

| | | |
|---|---|---|
| DE | 10028964 A1 | 1/2002 |
| EP | 0565746 A1 | 10/1993 |
| EP | 2782230 A2 | 9/2014 |
| GB | 165137 A | 6/1921 |
| SU | 150162 A1 | 11/1961 |

OTHER PUBLICATIONS

Notice of Allowance, dated Jun. 12, 2015, regarding U.S. Appl. No. 14/043,612, 5 pages.

Atmur et al., "Reluctance Motor with Dual-Pole Rotor System," U.S. Appl. No. 14/567,126, filed Dec. 11, 2014, 48 pages.

Extended European Search Report, dated May 2, 2016, regarding Application No. EP15199317.7, 8 pages.

Extended European Search Report, dated May 2, 2016, regarding Application No. EP15199616.2, 8 pages.

European Patent Office Examination Report, dated Jun. 27, 2017, regarding Application No. 15199616.2, 8 pages.

European Patent Office Examination Report, dated Apr. 10, 2017, regarding Application No. 15199317.7, 6 pages.

Atmur, "Peristaltic Pump System and Method Using Virtual Ellipse Motor," U.S. Appl. No. 14/031,055, filed Sep. 19, 2013, 38 pages.

Atmur, "Active-Active Redundant Motor Gear System," U.S. Appl. No. 13/941,401, filed Jul. 12, 2013, 23 pages.

Cameron et al., "Reluctance Motor System," U.S. Appl. No. 14/043,612, filed Oct. 1, 2013, 78 pages.

Cameron, "Quadrant Change Control in Brushless DC Motors," U.S. Appl. No. 13/933,803, filed Jul. 2, 2013, 82 pages.

Office Action, dated Nov. 7, 2014, regarding U.S. Appl. No. 14/043,612, 19 pages.

Office Action, dated Aug. 9, 2017, regarding U.S. Appl. No. 14/567,126, 11 pages.

Final Office Action, dated Nov. 16, 2017, regarding U.S. Appl. No. 14/567,126, 25 pages.

European Patent Office Examination Report, dated Nov. 24, 2017, regarding Application No. 15199616.2, 7 pages.

European Patent Office Examination Report, dated Nov. 9, 2017, regarding Application No. 15199317.7, 9 pages.

* cited by examiner

RELUCTANCE MOTOR WITH VIRTUAL ROTOR

CROSS-REFERENCE TO RELATED APPLICATION

This application is related to the following U.S. patent application Ser. No. 14/567,126, entitled "Reluctance Motor with Dual-Pole Rotor System," which is filed even day herewith and is incorporated herein by reference in its entirety.

BACKGROUND INFORMATION

1. Field

The present disclosure relates generally to electromechanical motors and, in particular, to reluctance motors. Still more particularly, the present disclosure relates to reluctance motors capable of converting electrical power into mechanical power with reduced torque ripple using a reduced number of magnetic poles.

2. Background

A reluctance motor is a type of electromechanical motor that runs by magnetic reluctance. In particular, with the concept of magnetic reluctance, a magnetic field causes magnetic flux to follow the path of least magnetic reluctance. Currently available reluctance motors typically include a stator and a rotor. Both the stator and the rotor have magnetic poles. Typically, the stator consists of electromagnetic coils arranged about a center axis in a manner that forms magnetic pole pairs. When these magnetic pole pairs are energized, a rotating magnetic field is created. This rotating magnetic field causes the magnetic poles of the rotor to move along the path of least magnetic reluctance.

While reluctance motors provide high power density at low cost, these types of motors may operate with higher torque ripple than desired. Torque ripple is the difference between the maximum torque and the minimum torque produced during one revolution. Further, higher torque ripples of these types of motors may create more noise than desired.

A switched reluctance motor is one type of reluctance motor. Switched reluctance motors have rotors with fewer magnetic poles than the magnetic poles on the stator. The magnetic poles of the stator may be referred to as stator poles and the magnetic poles of the rotor may be referred to as rotor poles. Typical switched reluctance motors have six stator poles and four rotor poles. While this configuration may reduce torque ripple, torque ripple may not be reduced to within desired tolerances for certain applications.

Currently available reluctance motors may be unable to provide torque ripple that is sufficiently low to meet selected requirements for systems such as, but not limited to, aerospace systems. Therefore, it would be desirable to have a method and apparatus that take into account at least some of the issues discussed above, as well as other possible issues.

SUMMARY

In one illustrative embodiment, an apparatus comprises a stator and a plate. The stator includes a plurality of electromagnetic coils having an overlapped configuration. Applying multi-phase current to the plurality of electromagnetic coils generates a magnetic field. The plate forms a virtual pole when a portion of the plate contacts the stator in response to the magnetic field. Rotating the magnetic field about a center axis through the stator rotates the virtual pole about the center axis.

In another illustrative embodiment, a reluctance motor comprises a housing, a stator, and a plate. The stator and the plate are located in the housing. The stator has at least three pole pairs. The plate is comprised at least partially of a magnetic material. The plate forms a virtual pole when a portion of the plate interfaces with the stator. Rotating a magnetic field generated by the stator about a center axis through the stator torques the virtual pole.

In yet another illustrative embodiment, a method for operating a reluctance motor is provided. Multi-phase current is applied to a plurality of electromagnetic coils of a stator of the reluctance motor to produce a magnetic field. The plurality of electromagnetic coils have an overlapped configuration. The magnetic field is rotated about a center axis through the stator using the multi-phase current to torque a virtual pole formed by a plate positioned relative to the stator and tilted towards the stator in response to an axial force created by the magnetic field.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a reluctance motor capable of providing desired torque ripple performance. In particular, it may be desirable to have a reluctance motor that is simple in design and cost-effective, while also providing reduced torque ripple.

The illustrative embodiments recognize and take into account that reducing the number of rotor poles induced in a reluctance motor may reduce torque ripple. Further, the illustrative embodiments recognize and take into account that torque ripple may be reduced by eliminating the need for a separate, physical rotor. Thus, the illustrative embodiments provide a reluctance motor that includes a stator with electromagnetic coils having an overlapped configuration that enables a reduction in the number of rotor poles needed.

Figure 1:
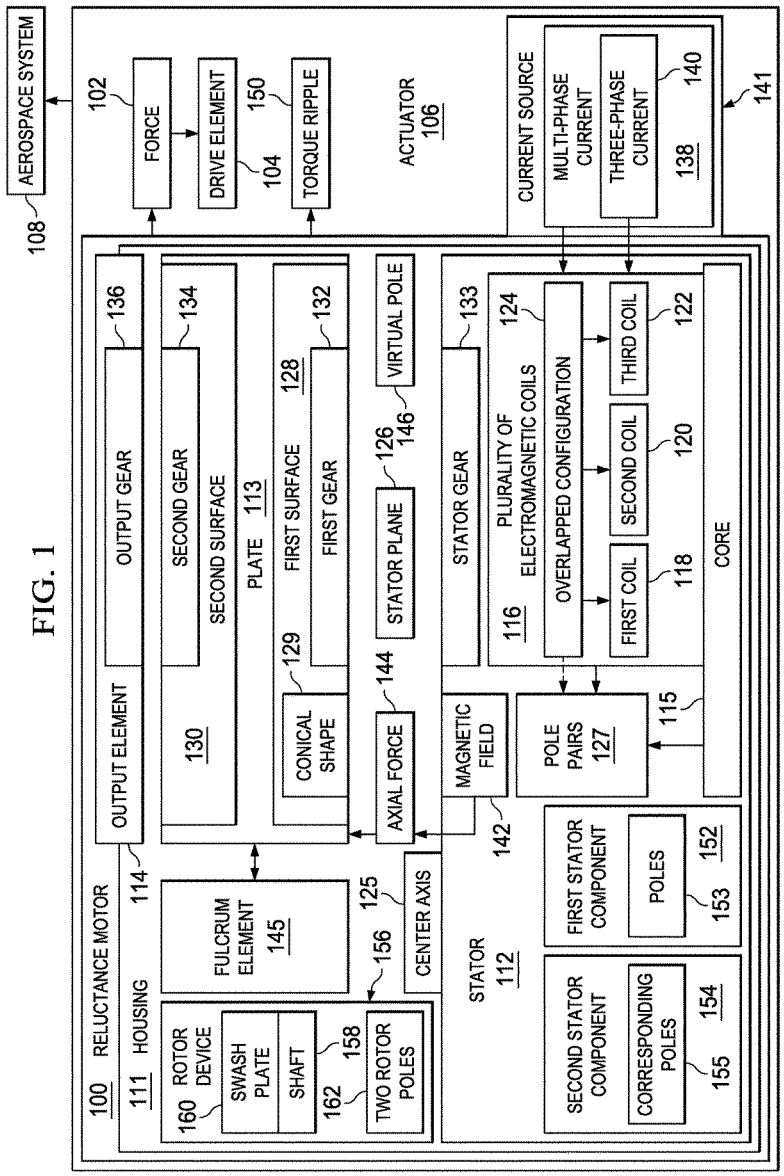
FIG. 1 is an illustration of a reluctance motor in the form of a block diagram in accordance with an illustrative embodiment.

Referring now to the figures and, in particular, with reference to FIG. 1, an illustration of a reluctance motor is depicted in the form of a block diagram in accordance with an illustrative embodiment. In this illustrative example, reluctance motor 100 may be used to produce force 102 that drives drive element 104. In other words, force 102 may move drive element 104. Together, drive element 104 and reluctance motor 100 may form actuator 106. Depending on the implementation, actuator 106 may take the form of a linear actuator or a rotary actuator.

Actuator 106 may be used to provide movement in different types of systems. For example, actuator 106 may be implemented as part of aerospace system 108. Aerospace system 108 may take the form of an aircraft, an unmanned aerial vehicle, a spacecraft, a space shuttle, a satellite, a space station, or some other type of aerospace system or platform. Of course, in other illustrative examples, actuator 106 may be used in some other type of system, including, but not limited to, a ground-based system, a water-based system, an engine system, a vehicle, a robotic system, or some other type of system.

In one illustrative embodiment, reluctance motor 100 includes housing 111, stator 112, plate 113, and output element 114. Stator 112, plate 113, and at least a portion of output element 114 may be housed within housing 111.

Stator 112 may include core 115 and plurality of electromagnetic coils 116. Core 115 may also be referred to as stator core. Core 115 may be comprised of a number of core members. As used herein, a "number of" items includes one or more items. In this manner, core 115 may include one or more core members. Each of these core members, and thereby core 115, may be comprised of a ferromagnetic material. In one illustrative example, core 115 may be comprised of iron.

Plurality of electromagnetic coils 116 may also be referred to as a plurality of windings in some cases. Each of plurality of electromagnetic coils 116 may be comprised of a conductive material capable of carrying a flow of electric current. Current passing through each of plurality of electromagnetic coils 116 generates a magnetic field. Each coil in plurality of electromagnetic coils 116 may be comprised of one or more coil elements conductively connected together or one or more windings conductively connected together.

In one illustrative example, plurality of electromagnetic coils 116 may include at least three electromagnetic coils. For example, without limitation, plurality of electromagnetic coils 116 may include first coil 118, second coil 120, and third coil 122.

Plurality of electromagnetic coils 116 may have overlapped configuration 124. With overlapped configuration 124, plurality of electromagnetic coils 116 may be arranged at least partially overlapping with respect to stator plane 126. Stator plane 126 may be a plane through stator 112 that is substantially perpendicular to center axis 125 through stator 112. Overlapped configuration 124 may be a configuration in which each of plurality of electromagnetic coils 116 overlaps at least one other one of plurality of electromagnetic coils 116 by a selected number of degrees with respect to stator plane 126 of stator 112.

As one illustrative example, first coil 118 may overlap second coil 120 with respect to stator plane 126 by about 120 degrees. Second coil 120 may overlap third coil 122 with respect to stator plane 126 by about 120 degrees. Third coil 122 may overlap first coil 118 with respect to stator plane 126 by about 120 degrees.

In this illustrative example, each of first coil 118, second coil 120, and third coil 122 may be subtended over roughly two-thirds of stator plane 126. For example, each of first coil 118, second coil 120, and third coil 122 may be subtended over about 240 degrees of stator plane 126. In other words, each of first coil 118, second coil 120, and third coil 122 may extend over about 240 degrees with respect to stator plane 126.

Together, core 115 and plurality of electromagnetic coils 116 may form pole pairs 127. In this illustrative example, pole pairs 127 may include at least three pole pairs. Each of pole pairs 127 may subtend about 120 degrees with respect to stator plane 126. Further, in this illustrative example, each of pole pairs 127 may be formed by the overlapped portions of two of plurality of electromagnetic coils 116.

As one illustrative example, the overlapping of first coil 118 and second coil 120 wrapped around a first portion of core 115 may form a first pole pair. The overlapping of second coil 120 and third coil 122 around a second portion of core 115 may form a second pole pair. The overlapping of third coil 122 and first coil 118 around a third portion of core 115 may form a third pole pair.

Plate 113 may be positioned relative to stator 112. Plate 113 may be at least partially comprised of a magnetic material. In particular, at least the portion of plate 113 that is configured to face stator 112 may be comprised of a magnetic material. The magnetic material may take the form of, for example, without limitation, magnetic steel.

Plate 113 may have first surface 128 that faces stator 112 and second surface 130 that faces output element 114. In this illustrative example, at least first surface 128 may have a curved shape. In one illustrative example, first surface 128 may have conical shape 129. At least first surface 128 may be comprised of the magnetic material.

First gear 132 may be associated with first surface 128 of plate 113. Second gear 134 may be associated with second surface 130 of plate 113. As used herein, when one component is "associated" with another component, the association is a physical association in the depicted examples.

For example, a first component, such as first gear 132, may be considered to be associated with a second component, such as plate 113, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

Additionally, as used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

First gear 132 may be configured for engagement with stator gear 133 associated with stator 112. Second gear 134 may be configured for engagement with output gear 136 associated with output element 114. Each of first gear 132, second gear 134, stator gear 133, and output gear 136 may be comprised of a plurality of teeth, which may also be referred to as gear teeth.

In this illustrative example, each of stator 112, plate 113, and output element 114 may be coaxially arranged with respect to center axis 125 through stator 112. In other words, each of stator 112, plate 113, and output element 114 may share center axis 125. Plate 113 may be positioned such that the center of mass of plate 113 lies along center axis 125.

Multi-phase current 138 may be applied to plurality of electromagnetic coils 116 by current source 141. In one illustrative example, multi-phase current 138 may take the form of three-phase current 140. Current source 141 may send three-phase current 140 into plurality of electromagnetic coils 116. Three-phase current 140 may include a first phase current, a second phase current, and a third phase current that may be sent into first coil 118, second coil 120, and third coil 122, respectively.

Three-phase current 140 may be sent into plurality of electromagnetic coils 116 in a manner that generates magnetic field 142. In particular, three-phase current 140 may be sent into plurality of electromagnetic coils 116 in a manner that generates magnetic field 142 that rotates about center axis 125 of stator 112.

Three-phase current 140 may be sent into plurality of electromagnetic coils 116 without needing to be switched on and off. In other words, the three currents for the three phases may be sent into plurality of electromagnetic coils 116 concurrently. Thus, plurality of electromagnetic coils 116 may all be energized concurrently. Rotation of magnetic field 142 about center axis 125 may be achieved without needing to de-energize one or more of plurality of electromagnetic coils 116.

The generation of magnetic field 142 creates axial force 144 that pulls a portion of plate 113 towards stator 112. In other words, axial force 144 causes a portion of plate 113 to tilt relative to center axis 125 towards stator 112. Plate 113 may be rotatably associated with fulcrum element 145. Fulcrum element 145 may allow tilting of plate 113.

The tilting of plate 113 may cause a portion of plate 113 to contact a portion of stator 112. In particular, when first surface 128 of plate 113 has conical shape 129, a line interface may be formed between first surface 128 of plate 113 and stator 112. This line interface may be a radial line contact between stator 112 and first surface 128 of plate 113. This line interface between stator 112 and first surface 128 of plate 113 may form virtual pole 146.

Virtual pole 146 may be considered a virtual rotor pole even though no physical rotor is present in reluctance motor 100. The rotation of magnetic field 142 about center axis 125 causes rotation of virtual pole 146 about center axis 125. In other words, virtual pole 146 may be torqued by rotating magnetic field 142.

However, the physical line interface that forms virtual pole 146 may not rotate about center axis 125. Rather, rotation of magnetic field 142 may cause the tilting of plate 113 about fulcrum element 145 to change such that the portion of first surface 128 that contacts stator 112 changes. In this manner, the line interface may be changed radially. As the tilt angle of plate 113 changes in response to the rotating magnetic field 142, the line interface also changes such that virtual pole 146 appears to rotate about center axis 125. The changing in the tilt of plate 113 may also be referred to as wobbling. Consequently, plate 113 may be sometimes referred to as a wobble plate.

The rotation of magnetic field 142 causes the location at which axial force 144 is applied to also rotate about center axis 125, which may, in turn, apply a torque to virtual pole 146. In this illustrative example, the location at which axial force 144 is applied may be maintained about 90 degrees away from virtual pole 146 in either a clockwise direction or counterclockwise direction to torque virtual pole 146.

For example, all three of the currents of three-phase current 140 may be applied to plurality of electromagnetic coils 116 in a synchronized manner that causes magnetic field 142 to rotate, and thereby, the location of axial force 144 to rotate about center axis 125. When this location of axial force 144 is rotated clockwise, axial force 144 may be considered as leading virtual pole 146 by about 90 degrees. When this location of axial force 144 is rotated counterclockwise, axial force 144 may be considered as lagging virtual pole 146 by about 90 degrees. This angular distance of about 90 degrees between the location of axial force 144 and virtual pole 146 may provide the most efficient conversion of magnetic force to torque.

The tilting of plate 113 towards stator 112 causes a portion of first gear 132 associated with plate 113 to engage stator gear 133 and a portion of second gear 134 associated with plate 113 to engage output gear 136. Stator gear 133 and output gear 136 may be substantially parallel to each other and may share center axis 125. Stator gear 133 and output gear 136 may be separated to provide sufficient tilting of plate 113 between stator gear 133 and output gear 136.

First gear 132 and second gear 134 of plate 113 allow torque to be produced between stator 112 and output element 114 without the use of a physical rotor. The tilting of plate 113 about fulcrum element 145 creates a virtual projection of an ellipse with respect to stator plane 126. For example, when plate 113 is tilted, plate 113, first gear 132, and second gear 134 may each appear as an ellipse when projected into stator plane 126. These virtual elliptical projections may be identical and thus considered as a single virtual elliptical projection. Rotation of magnetic field 142 rotates this virtual elliptical projection, thereby producing torque between stator gear 133 and output gear 136. In this manner, torque is produced between stator 112 and output element 114 using plate 113 without requiring rotation of plate 113 about center axis 125.

First gear 132, second gear 134, stator gear 133, and output gear 136 may each be comprised of teeth shaped such that the torque produced between stator gear 133 and output gear 136 results in rotation of output element 114. Rotation of output element 114 may be used to rotate drive element 104.

The configuration of reluctance motor 100 described above may produce torque with torque ripple 150 reduced to within selected tolerances. For example, torque ripple 150 may be reduced to below some selected threshold. Further, not having to de-energize one or more of plurality of electromagnetic coils 116 may reduce torque ripple 150. Rotation of virtual pole 146 as opposed to rotation of the multiple poles of a physical rotor may sufficiently reduce torque ripple 150 of reluctance motor 100 such that reluctance motor 100 may be used in desired systems. Further, this reduction in torque ripple 150 may reduce the noise generated by operation of reluctance motor 100. Still further, the configuration of reluctance motor 100 described above may provide start, stop, and direction control of reluctance motor 100.

In other illustrative examples, reluctance motor 100 may include rotor device 156 and stator 112 may include first stator component 152 and second stator component 154. Rotor device 156 may include shaft 158 and swash plate 160 associated with shaft 158.

First stator component 152 and second stator component 154 may be positioned at the opposite ends of shaft 158. First stator component 152 and second stator component 154 may be implemented in a manner similar to stator 112 described above. Each of plurality of electromagnetic coils 116 may be associated with each of first stator component 152 and second stator component 154. Core 115 may include, for example, without limitation, a cylindrical sleeve comprised of a ferromagnetic material that houses plurality of electromagnetic coils 116.

Together, core 115 and plurality of electromagnetic coils 116 may be configured such that first stator component 152 has poles 153 and second stator component 154 has corresponding poles 155. For example, without limitation, poles 153 may be magnetic North poles, while corresponding poles 155 may be magnetic South poles, or vice versa. In this illustrative example, poles 153 and corresponding poles 155 may include at least three poles and at least three corresponding poles, respectively, which together form at least three pole pairs.

In one illustrative example, first coil 118 may include a first winding that is wrapped around a core member of core 115 that is associated with first stator component 152 and a second winding that is wrapped around another core member of core 115 that is associated with second stator component 154. These two core members and windings may be used to establish a first pole pair. In this manner, the first pole pair may extend both axially and radially. Similarly, second coil 120 may include a first winding that is wrapped around a core member of core 115 that is associated with first stator component 152 and a second winding that is wrapped around another core member of core 115 that is associated with second stator component 154. These two core members and windings may be used to establish a second pole pair.

Further, third coil 122 may include a first winding that is wrapped around a core member of core 115 that is associated with first stator component 152 and a second winding that is wrapped around another core member of core 115 that is associated with second stator component 154. These two core members and windings may be used to establish a third pole pair.

Core 115 associated with first stator component 152 and second stator component 154 may be configured such that the two poles for each of these three pole pairs are about 180 degrees apart when projected onto stator plane 126. In this manner, in one illustrative example, first stator component 152 and second stator component 154 may be configured such that pole pairs 127 are formed between three poles 153 of first stator component 152 and three corresponding poles 155 of second stator component 154. The centers of poles 153 may be about 120 degrees apart. The centers of corresponding poles 155 may be about 120 degrees apart.

Rotor device 156 may have two rotor poles 162. First stator component 152 and second stator component 154 may be configured to produce magnetic field 142 that rotates when three-phase current 140 is applied to plurality of electromagnetic coils 116. Three-phase current 140 may be adjusted and sent into the coils of first stator component 152 and second stator component 154 in a manner that produces magnetic field 142 that rotates.

Magnetic field 142 may result in a magnetic flux path that passes from one of first stator component 152 and second stator component 154, through rotor device 156, to the other one of first stator component 152 and second stator component 154. As magnetic field 142 rotates about center axis 125, this magnetic flux path may also rotate about center axis 125.

Magnetic field 142 may cause tilting of swash plate 160 that causes one of two rotor poles 162 of rotor device 156 to be partially projected into the stator plane corresponding to first stator component 152, and the other one of the two rotor poles 162 to be partially projected into the stator plane corresponding to second stator component 154. These two stator planes may be substantially perpendicular to each other. These projections of two rotor poles 162 may result in a difference in magnetic reluctance that causes rotor device 156 to rotate.

This configuration of reluctance motor 100 may provide start, stop, and direction control of reluctance motor 100 using only two rotor poles. Further, this type of control may be provided without requiring any de-energizing of plurality of electromagnetic coils 116. By using only two rotor poles and by not having to de-energize one or more of plurality of electromagnetic coils 116, torque ripple 150 may be reduced. The reduction in torque ripple 150 may, in turn, reduce the noise generated by operation of reluctance motor 100.

The illustration of reluctance motor 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 2:
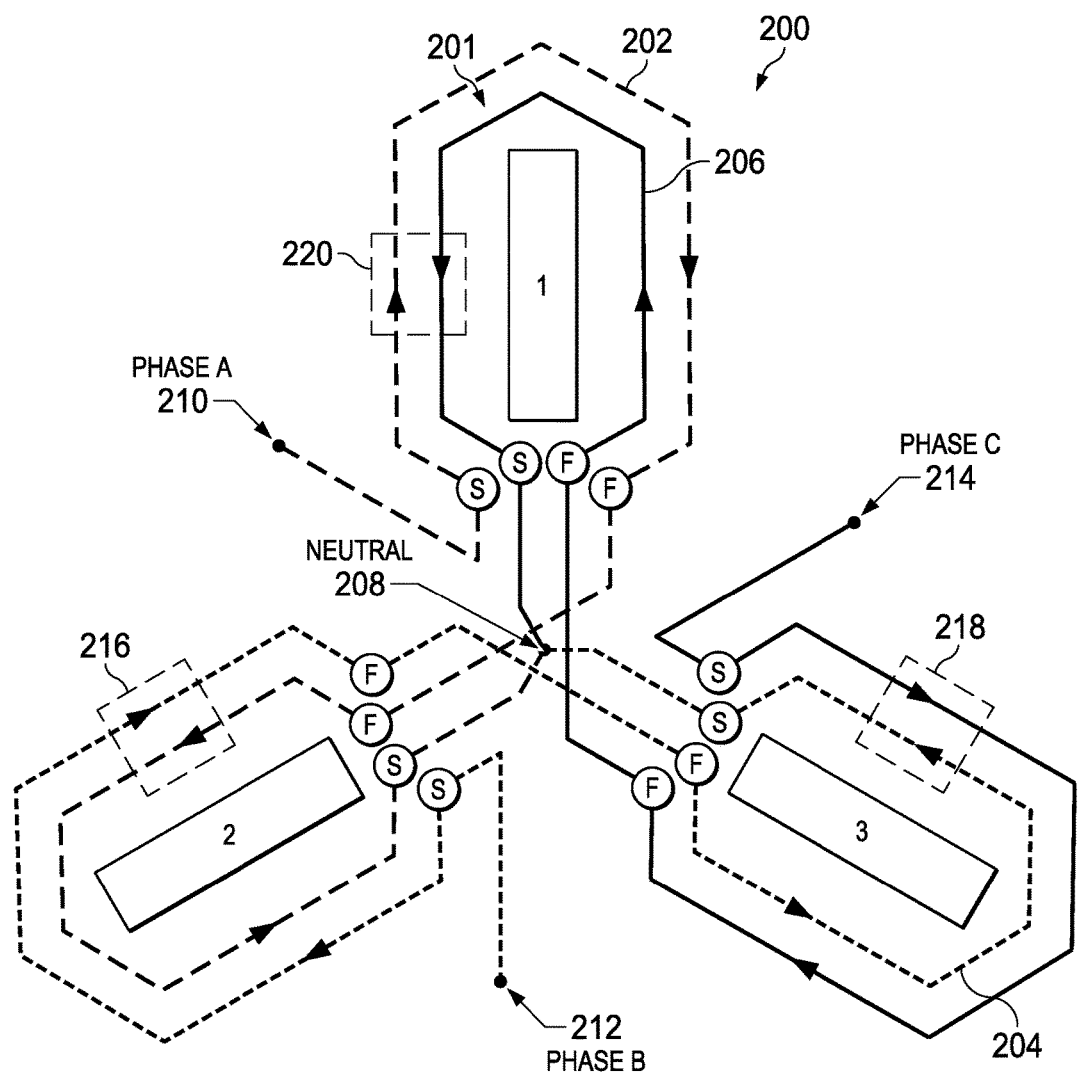
FIG. 2 is an illustration of a winding diagram in accordance with an illustrative embodiment.

With reference now to FIG. 2, an illustration of a winding diagram is depicted in accordance with an illustrative embodiment. In this illustrative example, winding diagram 200 depicts overlapped configuration 201 for first coil 202, second coil 204, and third coil 206. First coil 202, second coil 204, and third coil 206 are an example of one implementation for plurality of electromagnetic coils 116 in FIG. 1.

As depicted, a portion of first coil 202 is overlapped with a portion of second coil 204. A portion of second coil 204 is overlapped with a portion of third coil 206. Further, a portion of third coil 206 is overlapped with first coil 202.

In this illustrative example, each of first coil 202, second coil 204, and third coil 206 is connected to neutral 208. Phase A current 210 may be sent into first coil 202. Phase B current 212 may be sent into second coil 204. Phase C current 214 may be sent into third coil 206. Phase A current 210, phase B current 212, and phase C current 214 may be an example of one implementation for three-phase current 140 in FIG. 1.

As depicted, phase A current 210 and phase B current 212 may flow in opposite directions where first coil 202 and second coil 204 overlap. Phase B current 212 and phase C current 214 may flow in opposite directions where second coil 204 and third coil 206 overlap. Phase A current 210 and phase C current 214 may flow in opposite directions where third coil 206 and first coil 202 overlap.

Figure 3:
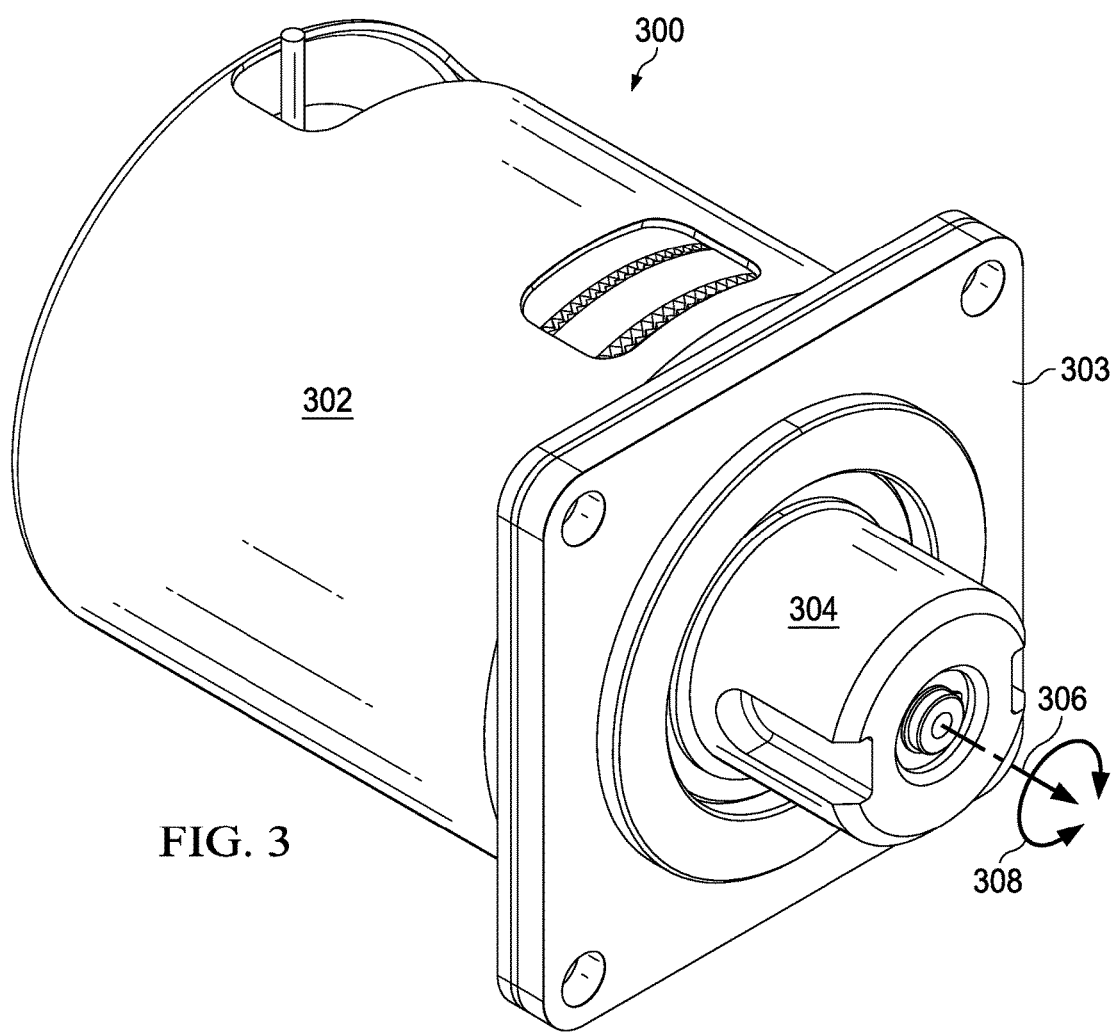
FIG. 3 is an illustration of an isometric view of a reluctance motor in accordance with an illustrative embodiment.

With reference now to FIG. 3, an illustration of an isometric view of a reluctance motor is depicted in accordance with an illustrative embodiment. In this illustrative example, reluctance motor 300 may be an example of one implementation for reluctance motor 100 in FIG. 1.

As depicted, reluctance motor 300 may include housing 302, retaining structure 303, and output element 304. Housing 302 may be an example of one implementation for housing 111 in FIG. 1. Retaining structure 303 may be used to attach reluctance motor 300 to some type of structure or system.

Output element 304 may be an example of one implementation for output element 114 in FIG. 1. Output element 304 may be configured for association with a drive element (not shown). In some case, output element 304 may be configured for association with a shaft (not shown). Reluctance motor 300 may produce a force that rotates output element 304, and, thereby, the drive element (not shown) associated with output element 304 about center axis 306. Output element 304 may be rotated in either direction along arrow 308 about center axis 306, depending on the implementation.

Figure 4:
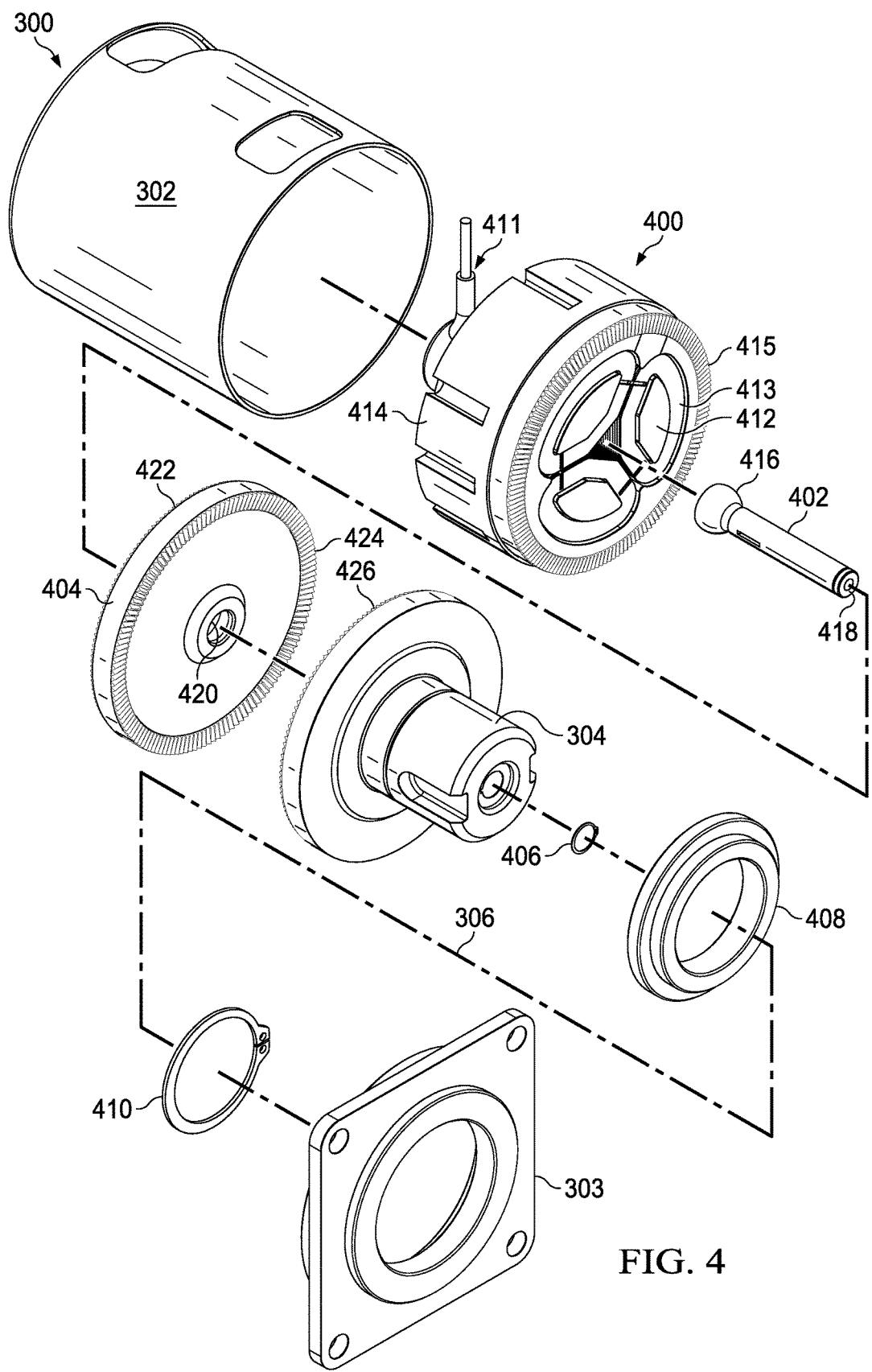
FIG. 4 is an illustration of an exploded front isometric view of a reluctance motor in accordance with an illustrative embodiment.

With reference now to FIG. 4, an illustration of an exploded front isometric view of reluctance motor 300 from FIG. 3 is depicted in accordance with an illustrative embodiment. Reluctance motor 300 from FIG. 3 may be exploded with respect to center axis 306 through reluctance motor 300.

In this illustrative example, other components of reluctance motor 300 may be seen in addition to housing 302, output element 304, and retaining structure 303. As depicted, reluctance motor 300 may include stator 400, fulcrum element 402, plate 404, retainer ring 406, retaining element 408, and retainer ring 410.

Stator 400 may be an example of one implementation for stator 112 in FIG. 1. Plate 404 may be an example of one implementation for plate 113 in FIG. 1. Fulcrum element 402 may be an example of one implementation for fulcrum element 145 in FIG. 1.

As depicted, sensor system 411 may be attached to stator 400. Sensor system 411 may be used to measure the position of plate 404 relative to the stator plane corresponding to stator 400 and the angular position of output element 304 relative to center axis 306.

In this illustrative example, stator 400 may include core 412, coils 413, stator housing 414, and stator gear 415. Core 412 and coils 413 may be located within stator housing 414. Stator gear 415 may be associated with stator housing 414. Core 412, coils 413, and stator gear 415 may be examples of implementations for core 115, plurality of electromagnetic coils 116, and stator gear 133, respectively, in FIG. 1.

Plate 404 may be configured for association with fulcrum element 402. Fulcrum element 402 may have curved end portion 416 and end portion 418. Plate 404 may have opening 420. Opening 420 of plate 404 may receive curved end portion 416 of fulcrum element 402. Plate 404 may be configured to tilt, or pivot, about curved end portion 416 of fulcrum element 402.

As depicted, first gear 422 and second gear 424 may be associated with plate 404. First gear 422 and second gear 424 may be examples of implementations for first gear 132 and second gear 134, respectively, in FIG. 1. When plate 404 is tilted about curved end portion 416 of fulcrum element 402, a portion of first gear 422 may engage stator gear 415, while a portion of second gear 424 may engage output gear 426 associated with output element 304.

Retainer ring 406, retaining element 408, and retainer ring 410 may be used to secure output element 304 to retaining structure 303. As described above, retaining structure 303 may be used to secure reluctance motor 300 to a drive element (not shown).

Figure 5:
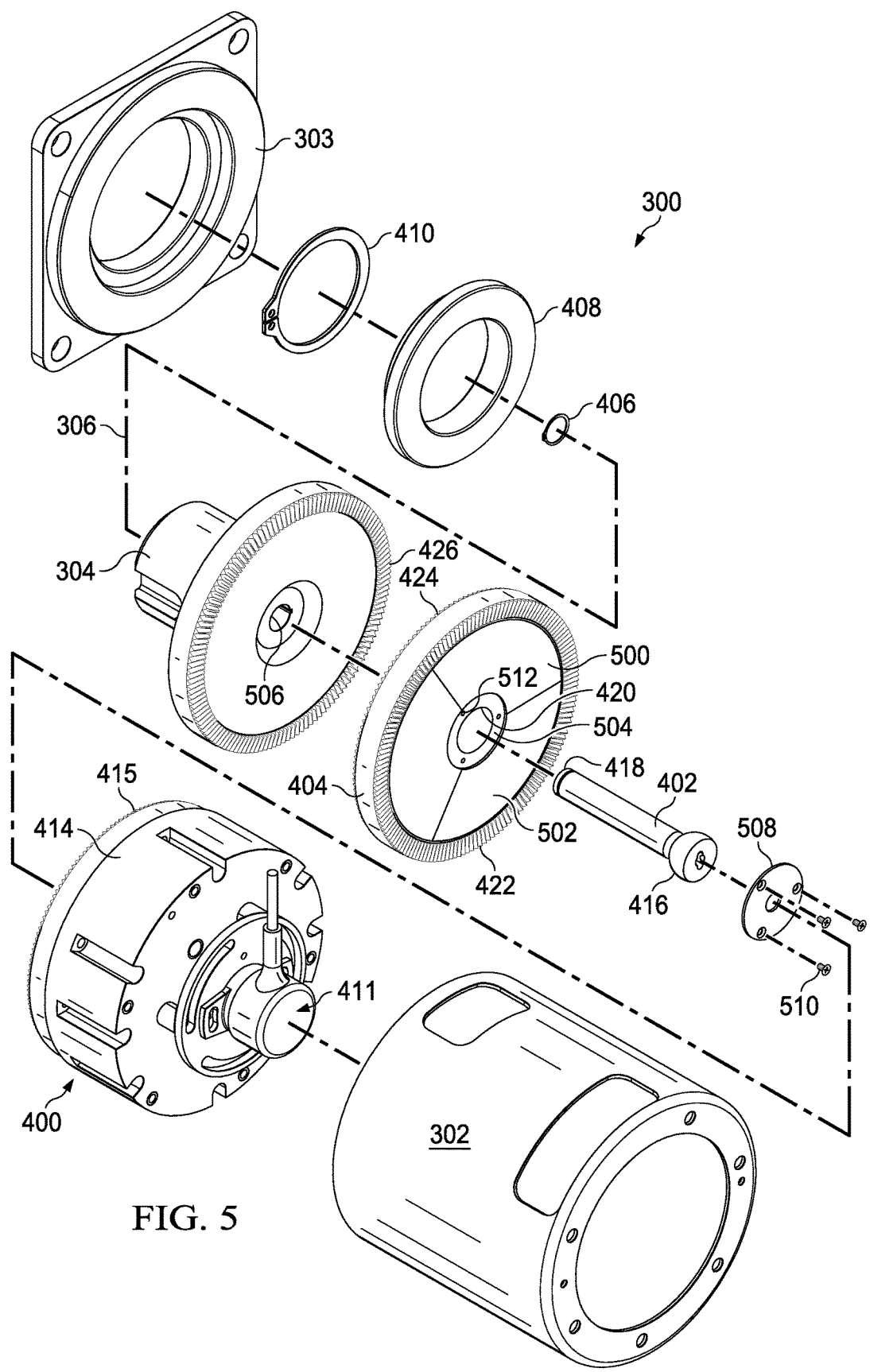
FIG. 5 is an illustration of an exploded back isometric view of a reluctance motor in accordance with an illustrative embodiment.

With reference now to FIG. 5, an illustration of an exploded back isometric view of reluctance motor 300 from FIGS. 3-4 is depicted in accordance with an illustrative embodiment. First gear 422 and output gear 426 may be more clearly depicted in this view. Further, sensor system 411 may also be more clearly visible in this view.

In this illustrative example, surface 500 of plate 404 may be seen. Surface 500 may have conical shape 502.

As depicted, holding area 504 may be formed by at least a portion of opening 420 through plate 404. Curved end portion 416 of fulcrum element 402 may be configured to sit within holding area 504. End portion 418 of fulcrum element 402 may pass through opening 420 through plate 404 and through opening 506 in output element 304.

Mounting plate 508 may be used to cover curved end portion 416. Fasteners 510 may be used to install mounting plate 508 by being installed within corresponding holes 512 in holding area 504.

Figure 6:
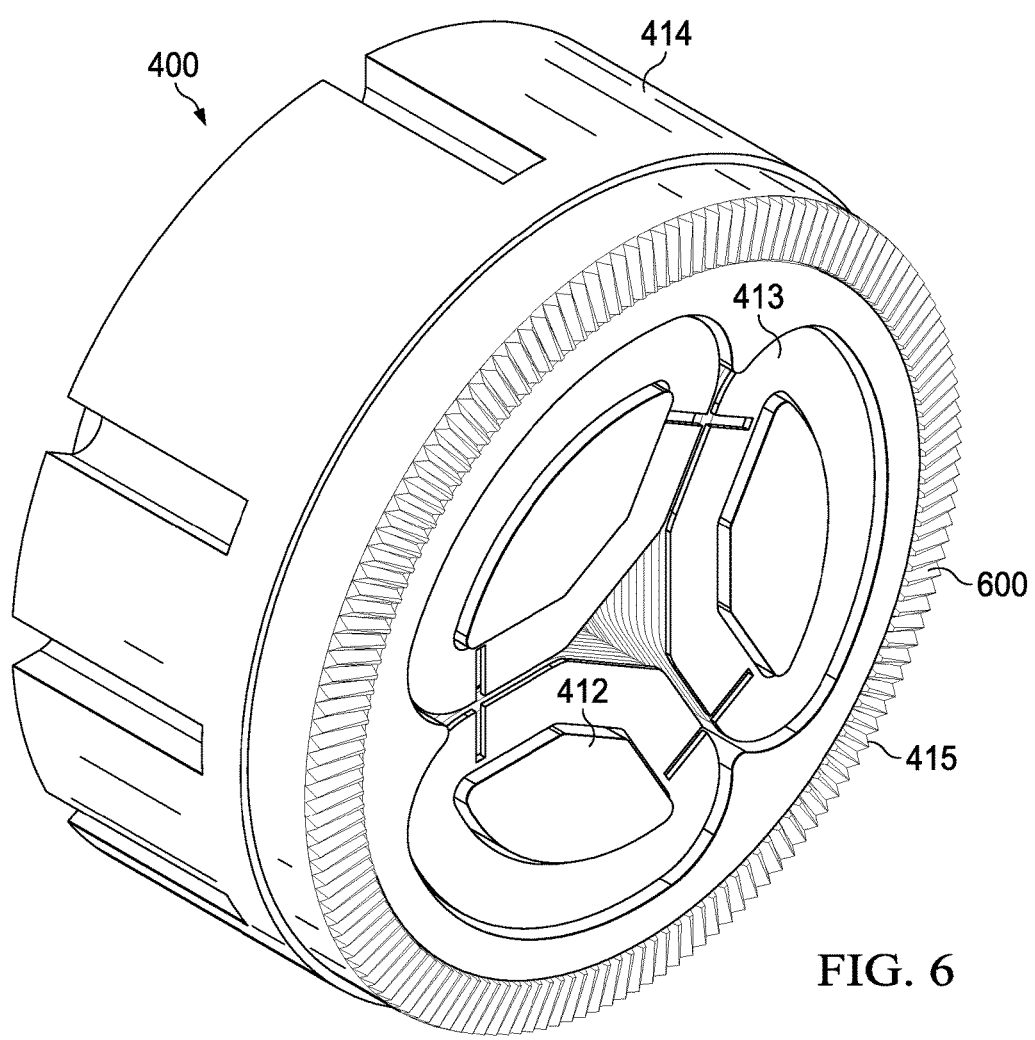
FIG. 6 is an illustration of an enlarged isometric view of a stator in accordance with an illustrative embodiment.

With reference now to FIG. 6, an illustration of an enlarged isometric view of stator 400 from FIG. 4 is depicted in accordance with an illustrative embodiment. In this illustrative example, teeth 600 of stator gear 415 may be more clearly seen.

Figure 7:
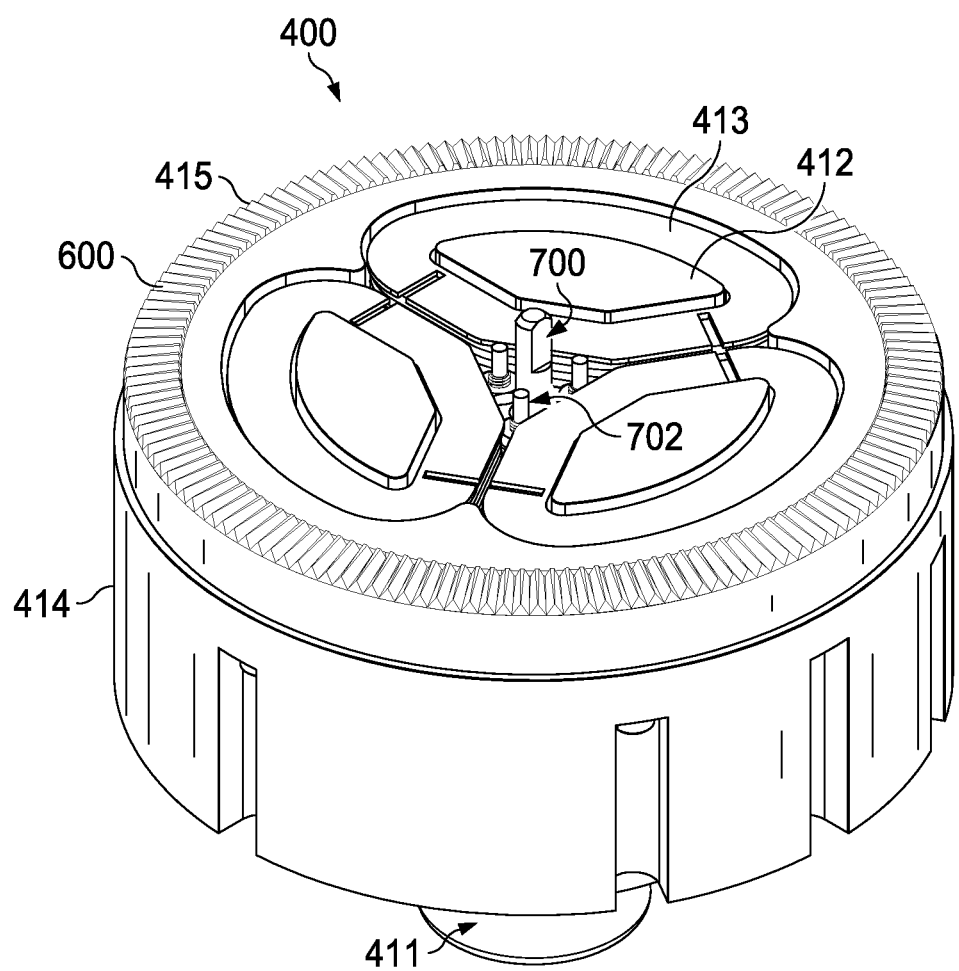
FIG. 7 is an illustration of a top isometric view of a stator in accordance with an illustrative embodiment.

Turning now to FIG. 7, an illustration of a top isometric view of stator 400 from FIG. 4 is depicted in accordance with an illustrative embodiment. As depicted, sensor system 411 may include angular position sensor 700 and distance sensors 702. Angular position sensor 700 may connect to output element 304 shown in FIGS. 3-5 and may be used to measure the angular position of output element 304 relative to center axis 306 in FIG. 3.

Distance sensors 702 may include three distance sensors that measure eddy currents for the purposes of measuring the distance between each distance sensor and plate 404 in FIGS. 4-5. By using these three distance measurements, the position of plate 404 relative to the stator plane may be known. In other words, distance measurements generated by distance sensors 702 may be used to measure the tilt of plate 404.

The information provided by sensor system 411 may be used to regulate reluctance motor 300. In particular, the information provided by sensor system 411 may be used to commutate reluctance motor 300 as needed.

Figure 8:
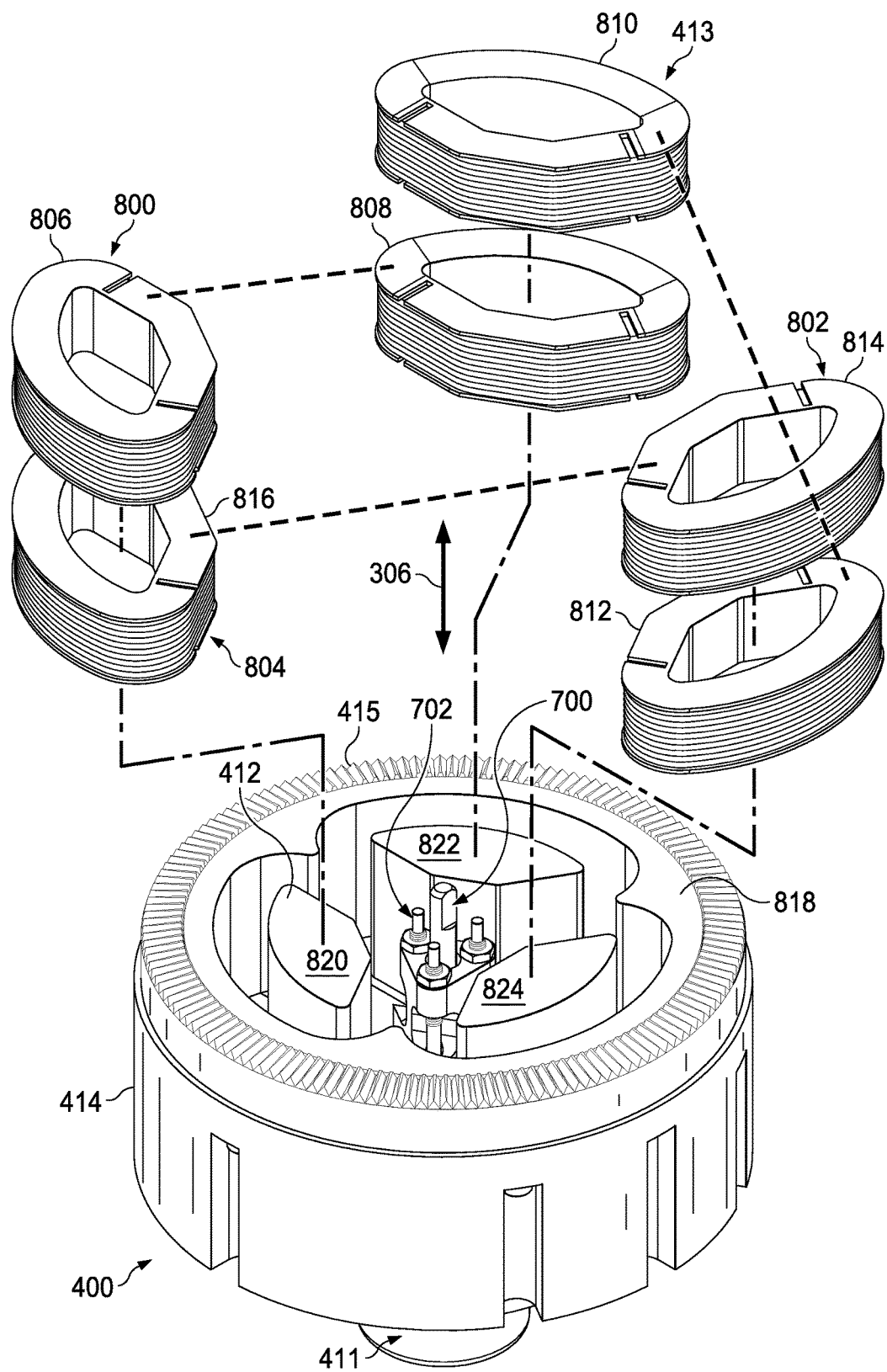
FIG. 8 is an illustration of an exploded top isometric view of a stator in accordance with an illustrative embodiment.

With reference now to FIG. 8, an illustration of an exploded top isometric view of stator 400 from FIG. 7 is depicted in accordance with an illustrative embodiment. In this illustrative example, core 412 and coils 413 may be more clearly visible.

As depicted, coils 413 may include first coil 800, second coil 802, and third coil 804. First coil 800, second coil 802, and third coil 804 may be examples of implementations for first coil 118, second coil 120, and third coil 122, respectively, in FIG. 1.

First coil 800 may be comprised of first portion 806 and second portion 808 that are connected to each other. Second coil 802 may be comprised of first portion 810 and second portion 812 that are connected to each other. Third coil 804 may be comprised of first portion 814 and second portion 816 that are connected to each other. The conductive connections between the two portions that make up each of first coil 800, second coil 802, and third coil 804 are shown in representational form in FIG. 8. The two portions that make up each of first coil 800, second coil 802, and third coil 804 may be wound and connected together in any configuration that enables desired generation of and rotation of a magnetic field in response to a three-phase current being applied to these coils.

As depicted, first portion 806 of first coil 800 and second portion 816 of third coil 804 may overlap. Second portion 808 of first coil 800 and first portion 810 of second coil 802 may overlap. Second portion 812 of second coil 802 and first portion 814 of third coil 804 may overlap. Each of first coil 800, second coil 802, and third coil 804 may be subtended over a stator plane substantially perpendicular to center axis 306 by about 240 degrees. Further, the portions of first coil 800, second coil 802, and third coil 804 that overlap may overlap by about 120 degrees with respect to this stator plane.

Core 412 may include core ring 818, core member 820, core member 822, and core member 824. Each of core member 820, core member 822, and core member 824 may be associated with core ring 818. In this illustrative example, first portion 806 of first coil 800 and second portion 816 of third coil 804 may be wound around core member 820. Second portion 808 of first coil 800 and first portion 810 of second coil 802 may be wound around core member 822. Second portion 812 of second coil 802 and first portion 814 of third coil 804 may be wound around core member 824.

Figure 9:
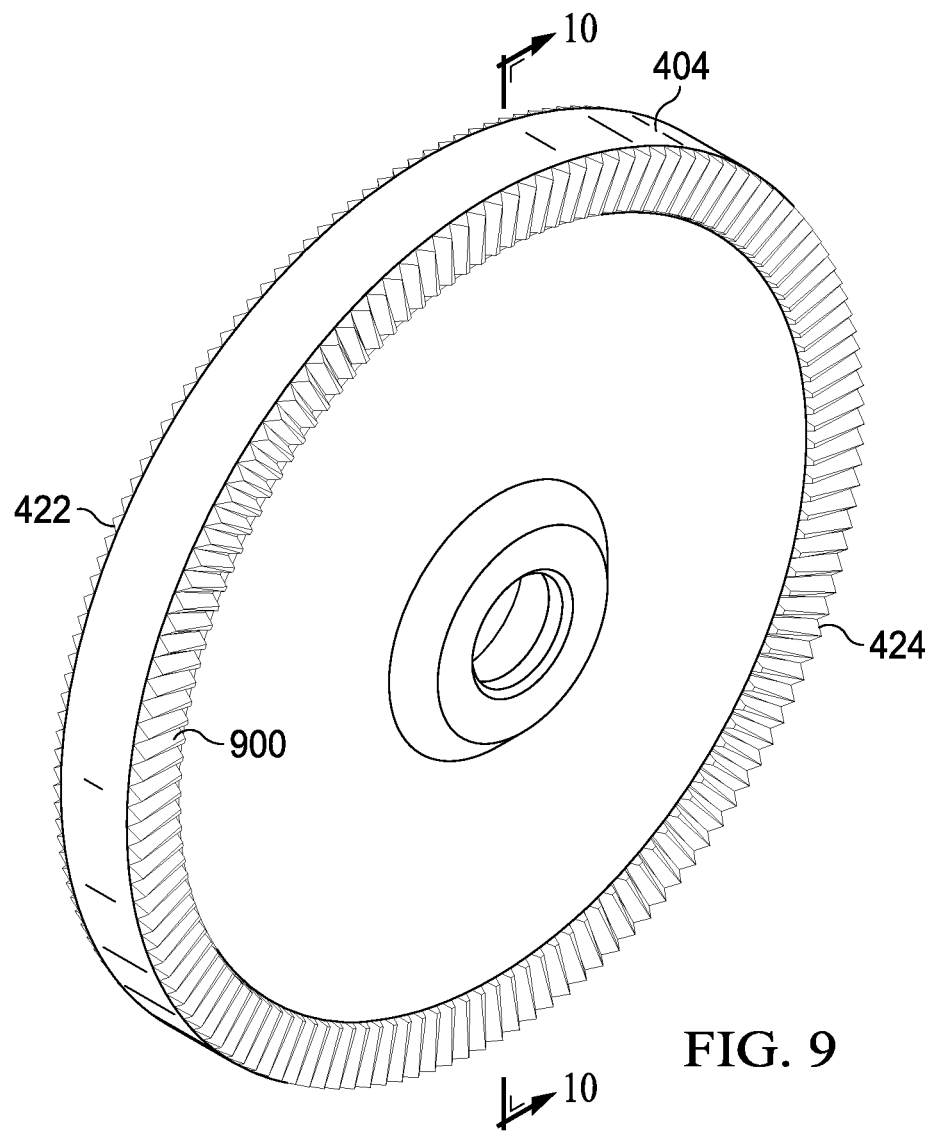
FIG. 9 is an illustration of an enlarged isometric view of a plate in accordance with an illustrative embodiment.

With reference now to FIG. 9, an illustration of an enlarged isometric view of plate 404 from FIG. 4 is depicted in accordance with an illustrative embodiment. In this illustrative example, teeth 900 of second gear 424 associated with plate 404 may be more clearly seen.

Figure 10:
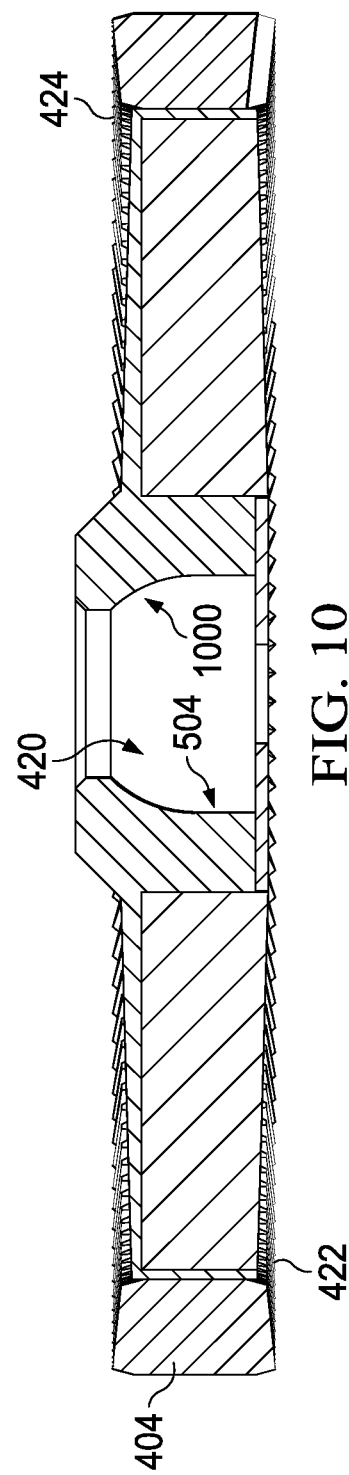
FIG. 10 is an illustration of a cross-sectional view of a plate in accordance with an illustrative embodiment.

With reference now to FIG. 10, an illustration of a cross-sectional view of plate 404 from FIG. 9 is depicted in accordance with an illustrative embodiment. In this illustrative example, a cross-sectional view of plate 404 from FIG. 9 is depicted taken in the direction of lines 10-10 in FIG. 9. Holding area 504 may be more clearly seen in this illustrative example. Holding area 504 may have curved shape 1000 configured to receive curved end portion 416 of fulcrum element 402 shown in FIGS. 4-5.

Figure 11:
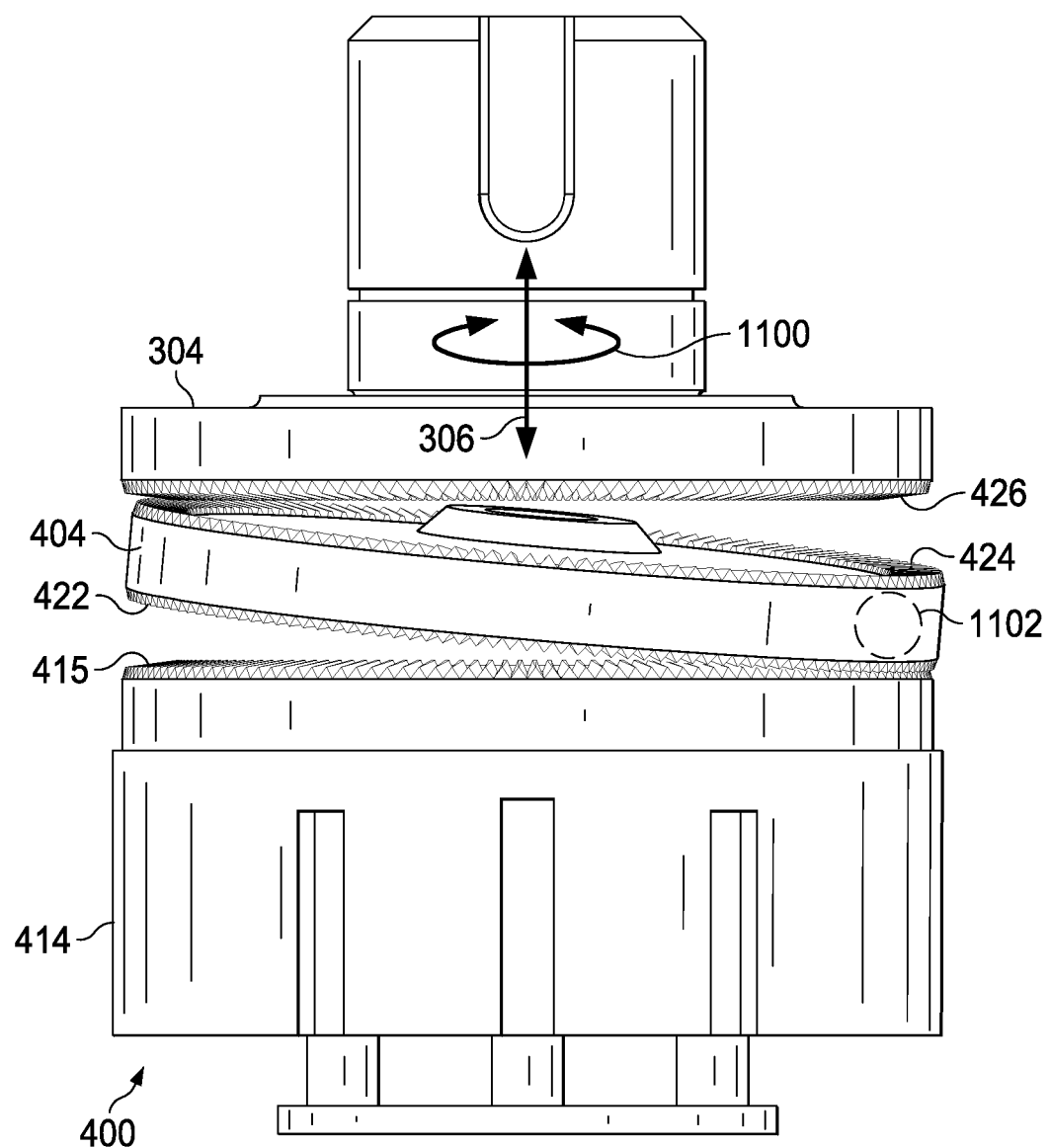
FIG. 11 is an illustration of a side view of a stator, a plate, and an output element in accordance with an illustrative embodiment.

With reference now to FIG. 11, an illustration of a side view of stator 400, plate 404, and output element 304 from FIGS. 4-5 is depicted in accordance with an illustrative embodiment. In this illustrative example, plate 404 is shown without fulcrum element 402 from FIG. 2 for clarity.

Plate 404 may tilt. When plate 404 is tilted, a portion of first gear 422 may engage a portion of stator gear 415 and a portion of second gear 424 may engage a portion of output gear 426. The tilting of plate 404 may create a virtual elliptical projection in the stator plane that is substantially perpendicular to center axis 306.

Rotation of a magnetic field by stator 400 may change the tilt, or wobble, of plate 404 such that this virtual elliptical projection is rotated about center axis 306 in a direction of arrow 1100. In particular, the virtual elliptical projection may be rotated without requiring rotation of plate 404 about center axis 306. In this illustrative example, portion 1102 of plate 404 has been tilted towards stator 400.

Figure 12:
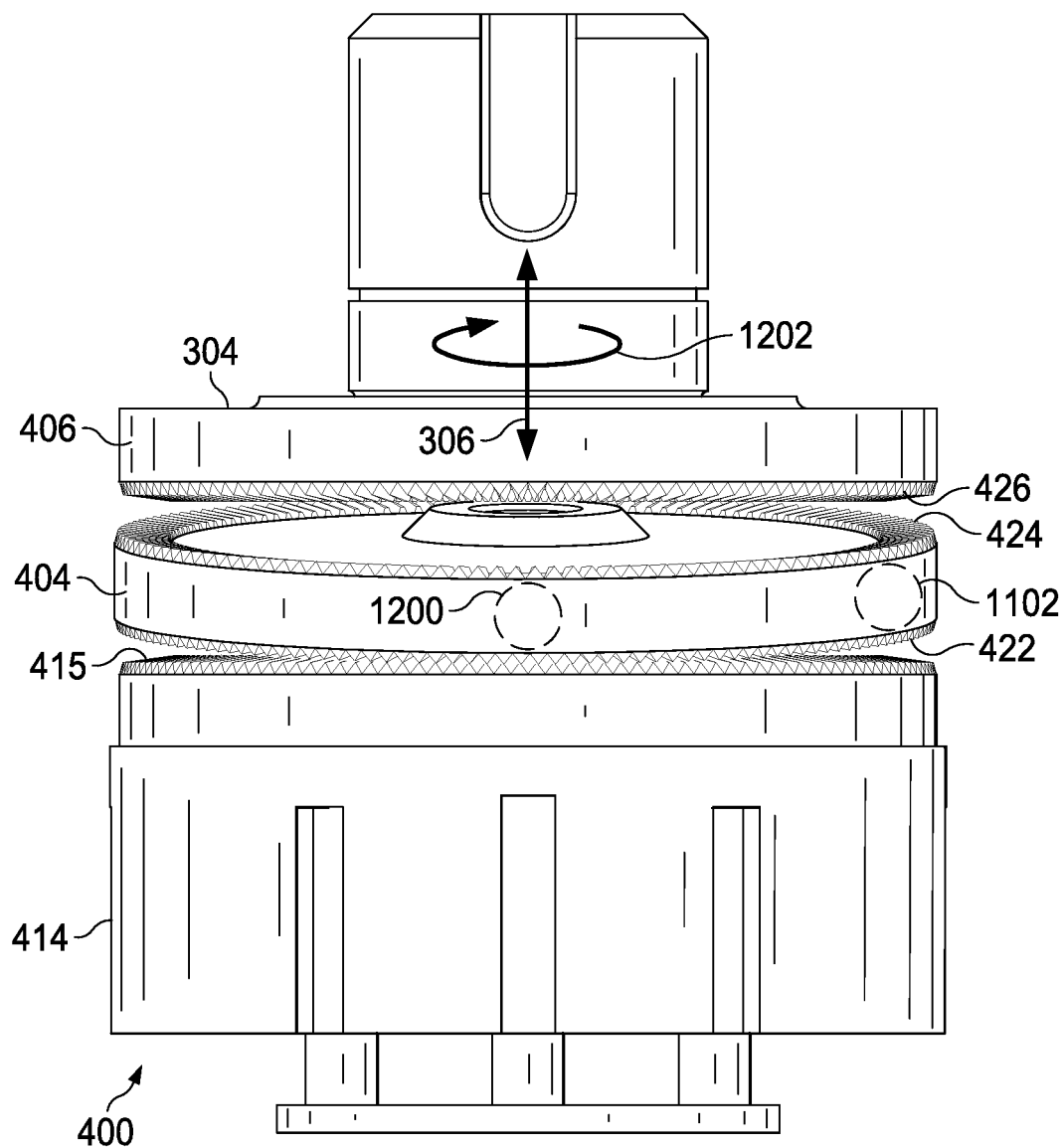
FIG. 12 is an illustration of a change in the tilt of a plate in accordance with an illustrative embodiment.

With reference now to FIG. 12, an illustration of a change in the tilt of plate 404 from the tilt of plate 404 in FIG. 11 is depicted in accordance with an illustrative embodiment. In this illustrative example, the portion of plate 404 tilted has changed. Portion 1200 of plate 404 is tilted towards stator 400. However, as depicted, plate 404 has not rotated about center axis 306. Rather, the virtual elliptical projection created by the tilting of portion 1200 of plate 404 towards stator 400 has rotated in the direction arrow 1202.

Figure 13:
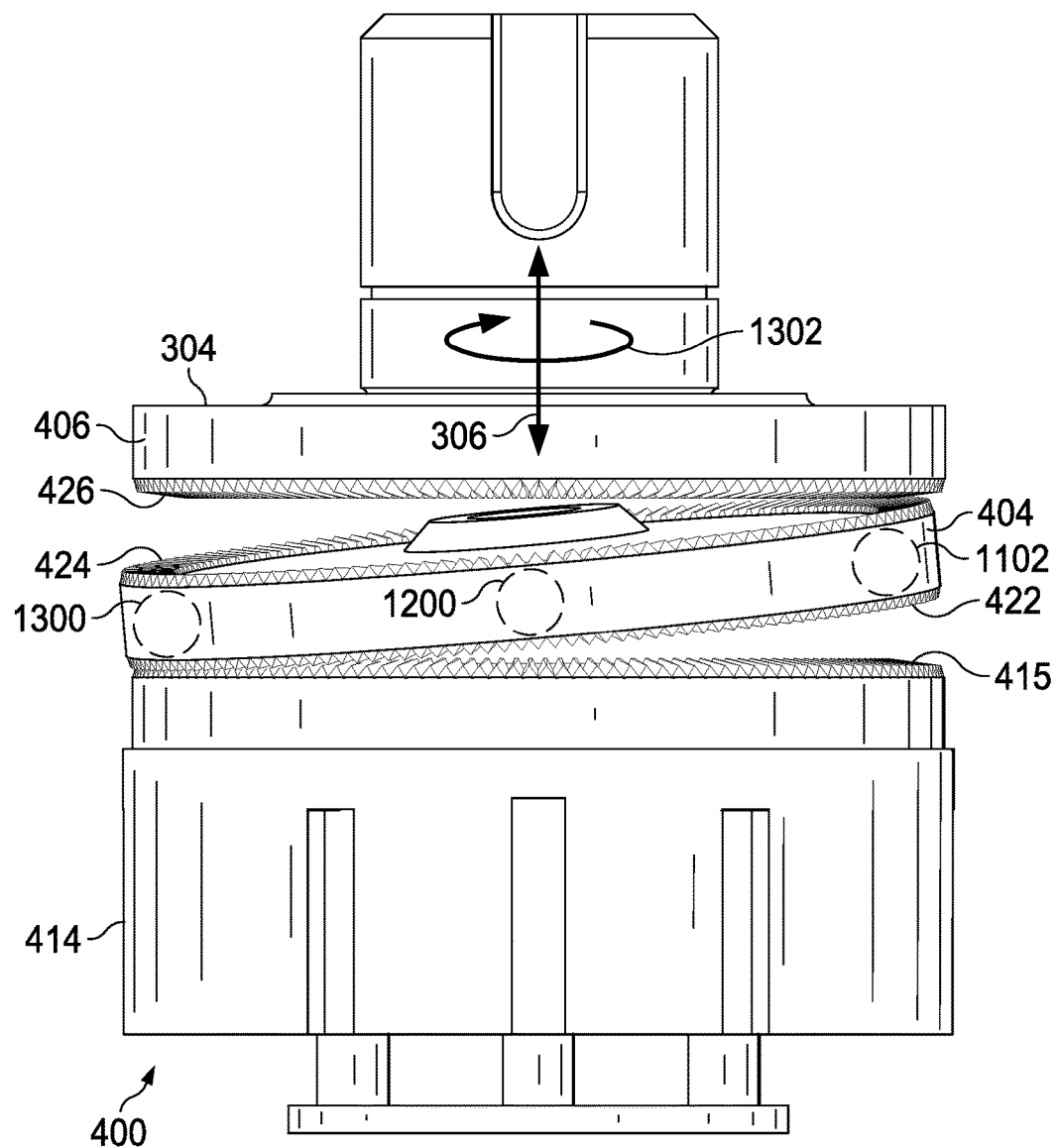
FIG. 13 is an illustration of a change in the tilt of a plate in accordance with an illustrative embodiment.

With reference now to FIG. 13, an illustration of a change in the tilt of plate 404 from the tilt of plate 404 in FIG. 11 is depicted in accordance with an illustrative embodiment. In this illustrative example, the portion of plate 404 tilted has changed. Portion 1300 of plate 404 is tilted towards stator 400. However, as depicted, plate 404 has not rotated about center axis 306. Rather, the virtual elliptical projection created by the tilting of portion 1300 of plate 404 towards stator 400 has rotated in the direction arrow 1302.

The illustrations of winding diagram 200 in FIG. 2 and the various components of reluctance motor 300 in FIGS. 3-13 are not meant to imply physical or architectural limitations to the manner in which an illustrative embodiment may be implemented. Other components in addition to or in place of the ones illustrated may be used. Some components may be optional.

The different components shown in FIGS. 3-13 may be illustrative examples of how components shown in block form in FIG. 1 can be implemented as physical structures. Additionally, some of the components in FIGS. 3-13 may be combined with components in FIG. 1, used with components in FIG. 1, or a combination of the two.

Figure 14:
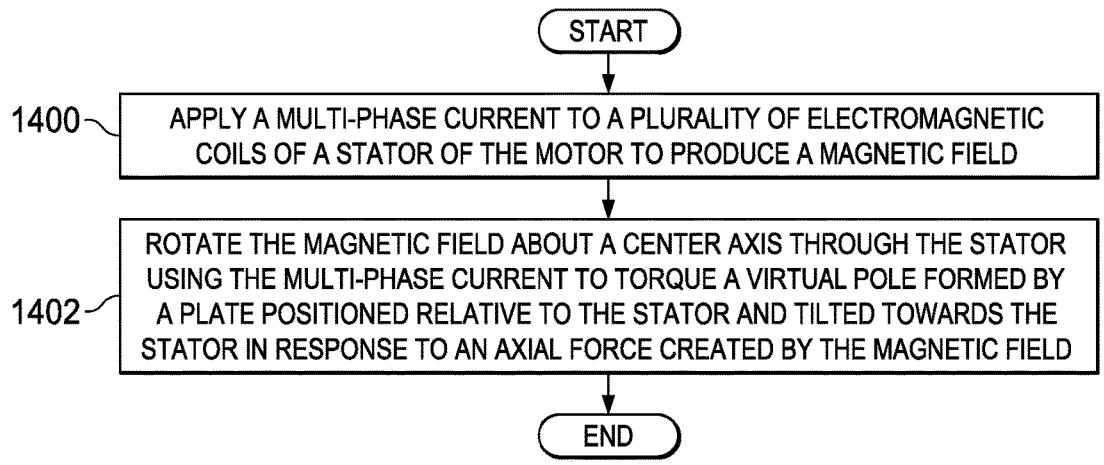
FIG. 14 is an illustration of a process for operating a reluctance motor in the form of a flowchart in accordance with an illustrative embodiment.

With reference now to FIG. 14, an illustration of a process for operating a reluctance motor is depicted in the form of flowchart in accordance with an illustrative embodiment. The process illustrated in FIG. 14 may be implemented to operate, for example, reluctance motor 100 described in FIG. 1.

The process may begin by applying multi-phase current to a plurality of electromagnetic coils of a stator of the motor to produce a magnetic field (operation 1400). The plurality of electromagnetic coils have an overlapped configuration.

Next, the magnetic field is rotated about a center axis through the stator using the multi-phase current to torque a virtual pole formed by a plate positioned relative to the stator and tilted towards the stator in response to an axial force created by the magnetic field (operation 1402), with the process terminating thereafter.

Figure 15:
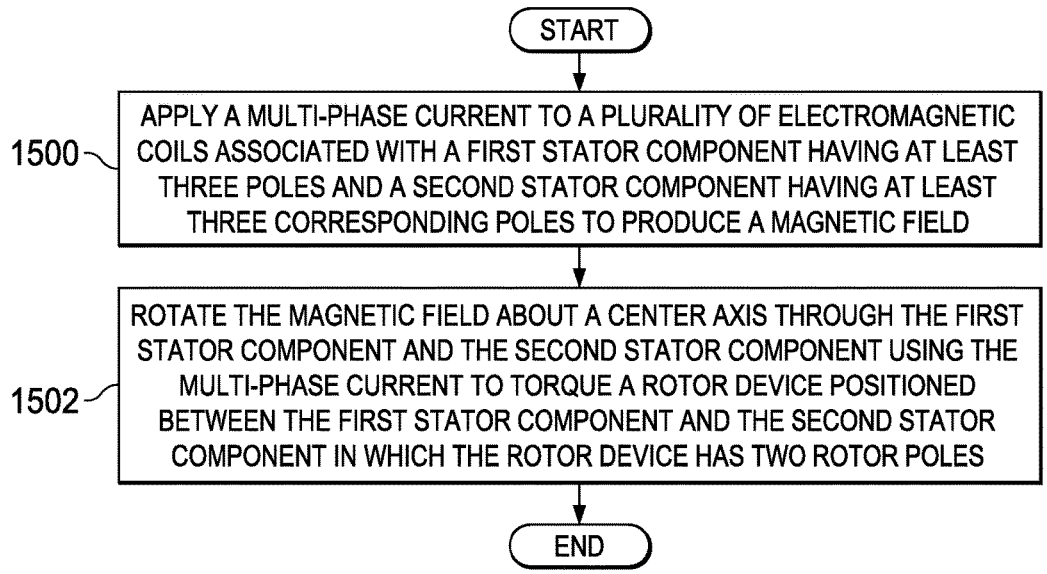
FIG. 15 is an illustration of a process for operating a reluctance motor in the form of a flowchart in accordance with an illustrative embodiment.

With reference now to FIG. 15, an illustration of a process for operating a reluctance motor is depicted in the form of flowchart in accordance with an illustrative embodiment.

The process illustrated in FIG. 15 may be implemented to operate, for example, reluctance motor 100 described in FIG. 1.

The process may begin by applying multi-phase current to a plurality of electromagnetic coils associated with a first stator component having at least three poles and a second stator component having at least three corresponding poles to produce a magnetic field (operation 1500). Next, the magnetic field is rotated about a center axis through the first stator component and the second stator component using the multi-phase current to torque a rotor device positioned between the first stator component and the second stator component and having two rotor poles (operation 1502), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a stator that includes a plurality of electromagnetic coils having an overlapped configuration, wherein the plurality of electromagnetic coils are configured to generate a magnetic field in response to a multi-phase current supplied to the plurality of coils; and
    a plate that forms a virtual pole when a portion of the plate contacts the stator in response to the magnetic field, wherein the plate has a surface with a conical shape such that the virtual pole is formed by a line interface between the surface and the stator such that rotating the magnetic field about a center axis through the stator rotates the virtual pole about the center axis.

2. The apparatus of claim 1, wherein the plurality of electromagnetic coils comprises:
    a first coil;
    a second coil; and
    a third coil, wherein the overlapped configuration includes the first coil overlapping the second coil by about 120 degrees relative to the center axis, the second coil overlapping the third coil by about 120 degrees relative to the center axis, and the third coil overlapping the first coil by about 120 degrees relative to the center axis.

3. The apparatus of claim 1, wherein the plurality of electromagnetic coils comprises at least three electromagnetic coils.

4. The apparatus of claim 3, wherein each of the at least three electromagnetic coils is subtended over about 240 degrees relative to the center axis with respect to a stator plane corresponding to the stator.

5. The apparatus of claim 1, wherein the stator further comprises:
    a core comprised of a ferromagnetic material.

6. The apparatus of claim 5, wherein the core and the plurality of electromagnetic coils form at least three pole pairs.

7. The apparatus of claim 1, wherein the multi-phase current comprises three-phase current.

8. The apparatus of claim 1 further comprising:
    a housing, wherein the stator and the plate are located within the housing.

9. The apparatus of claim 1 further comprising:
    a fulcrum element having a curved end portion, wherein the plate is configured to tilt about the curved end portion.

10. The apparatus of claim 1, wherein the plate comprises:
    a first gear; and
    a second gear.

11. The apparatus of claim 10, wherein the stator comprises:
    a stator housing; and
    a stator gear associated with the stator housing, wherein the stator gear is configured to at least partially engage the first gear.

12. The apparatus of claim 10 further comprising:
    an output element; and
    an output gear associated with the output element, wherein the second gear is configured to at least partially engage the output gear.

13. The apparatus of claim 1, wherein the stator and the plate form a reluctance motor that produces a force that moves a drive element.

14. A reluctance motor comprising:
    a housing;
    a stator located in the housing and having at least three pole pairs; and
    a plate located in the housing and comprised at least partially of a magnetic material, wherein the plate has a surface with a conical shape such that a virtual pole is formed by a line interface between the surface and the stator such that rotating a magnetic field generated by the stator about a center axis through the stator torques the virtual pole.

15. The reluctance motor of claim 14 further comprising:
    a fulcrum element having a curved end portion that mates with a holding area of the plate, wherein the plate is tiltable about the curved end portion.

16. A method for operating a reluctance motor, the method comprising:
    applying a multi-phase current to a plurality of electromagnetic coils, the plurality of electromagnetic coils disposed in a stator of the reluctance motor, wherein applying the multi-phase current produces a magnetic field, and wherein the plurality of electromagnetic coils have an overlapped configuration; and
    rotating the magnetic field about a center axis through the stator using the multi-phase current to torque a virtual pole formed by a plate positioned relative to the stator and tilted towards the stator in response to an axial force created by the magnetic field, wherein the virtual pole is formed by a line interface between a surface of the plate and the stator, the surface being conical in an axial direction of the plate.

17. The method of claim 16, wherein applying the multi-phase current comprises:
applying a first phase current to a first coil;
applying a second phase current to a second coil; and
applying a third phase current to a third coil.

18. The method of claim 17, wherein rotating the magnetic field comprises:
adjusting at least one of the first phase current, the second phase current, or the third phase current.

* * * * *